(12) United States Patent
Suzuki et al.

(10) Patent No.: US 6,707,816 B1
(45) Date of Patent: Mar. 16, 2004

(54) INTEGRATED SIGNALING / PAYLOAD CROSS CONNECT ARCHITECTURE

(75) Inventors: Shiro Suzuki, Folsom, CA (US); Bill Check, Elk Grove, CA (US); Samuel S. Rhodes, Colfax, CA (US)

(73) Assignee: Intel Corporation, Santa Clara, CA (US)

(*) Notice: Subject to any disclaimer, the term of this patent is extended or adjusted under 35 U.S.C. 154(b) by 770 days.

(21) Appl. No.: 09/608,353

(22) Filed: Jun. 29, 2000

(51) Int. Cl.[7] .......................... H04L 12/28; H04L 12/43
(52) U.S. Cl. .......................... 370/389; 370/458
(58) Field of Search .......................... 370/351–4, 357, 370/359–60, 369–389, 458, 400, 463, 474; 710/131, 132; 361/760, 761, 778, 779

(56) References Cited

U.S. PATENT DOCUMENTS

| | | | |
|---|---|---|---|
| 4,685,101 A | | 8/1987 | Segal et al. |
| 4,697,262 A | | 9/1987 | Segal et al. |
| 5,282,195 A | * | 1/1994 | Hood et al. ................. 370/378 |
| 5,970,130 A | | 10/1999 | Katko |
| 6,009,106 A | | 12/1999 | Rustad et al. |
| 6,285,687 B1 | | 9/2001 | Lovelace et al. |
| 6,289,018 B1 | * | 9/2001 | Song ........................ 370/395.6 |
| 6,385,165 B1 | | 5/2002 | Kumata |
| 6,539,027 B1 | * | 3/2003 | Cambron ..................... 370/442 |

OTHER PUBLICATIONS

Stallings, ISDN and Broadband ISDN with Frame Relay and ATM, 1989, Prentice–Hall, Inc., 4th edition, pp.:25, 124–6.*
Newton, Newton's Telecom Dictionary, 1996, Flatiron Publishing, 10 edition, pp.:973–4.*

* cited by examiner

Primary Examiner—David Vincent
(74) Attorney, Agent, or Firm—Fish & Richardson P.C.

(57) ABSTRACT

A transceiver for switching signals between a transmission line and a networked system includes a cross connect for switching payload information and a processor for switching signaling information. The payload and signaling information is formatted into time slots in frames transmitted and received over the transmission line, e.g., a T1 line. The payload and signaling information is switched according to a time slot interchange map. The processor may switch the signaling information between the line side and system side of the transceiver by a stable signaling value for a time slot ad writing that value to an appropriate memory location in a line side register on a system side register, depending on the direction of data flow.

19 Claims, 4 Drawing Sheets

INTEGRATED SIGNALING / PAYLOAD CROSS CONNECT ARCHITECTURE

BACKGROUND

A T1 transmission line, also referred to as a DS1 line, is a dedicated telephone connection that may support data ranges of up to 1.544 Mbits per second (Mbps). A T1 line may have 24 individual channels, each of which support 64 Kbps. Each 64 Kbps channel may be configured to carry digital data that may represent voice or other types of analog data, or purely digital information.

E1 is the European format for digital transmission and is similar to the North American T1. E1 carries signals at 2.048 Mbps (32 channels at 64 Kbps). E1 and T1 lines may be interconnected for international use.

T1/E1 transceivers may receive and transmit digital signals over a telephone communication transmission line to a connecting communication system, for example, a business computer network. T1 (and E1) lines may be used as a leased line option for businesses connecting to the Internet and for Internet Service Providers (ISPs) connecting to the Internet backbone.

Data transmitted over a T1 line may be formatted in frames comprising a predetermined number of bits, e.g., 193 bits for a standard T1 frame 100 including twenty-four time slots 102, as shown in FIG. 1. The frame may include payload information and signaling information. The payload information contains the digital representation of the originally transmitted voice/data signal. Signaling information may represent phone receiver status (e.g., on-hook or off-hook) and other service type information.

A framer at the transmission line/system interface may extract the signaling information from the payload information in the frame. The payload information may be switched by a cross connect over dedicated circuitry according to a switching table. The cross connect may also include dedicated circuitry for switching signaling information separately from the associated payload information. Such additional dedicated circuitry may increase the size and complexity of the cross connect and reduce the operational flexibility of the device.

BRIEF DESCRIPTION OF DRAWINGS

Like reference symbols in the various drawings indicate like elements.

DETAILED DESCRIPTION

Figure 2:
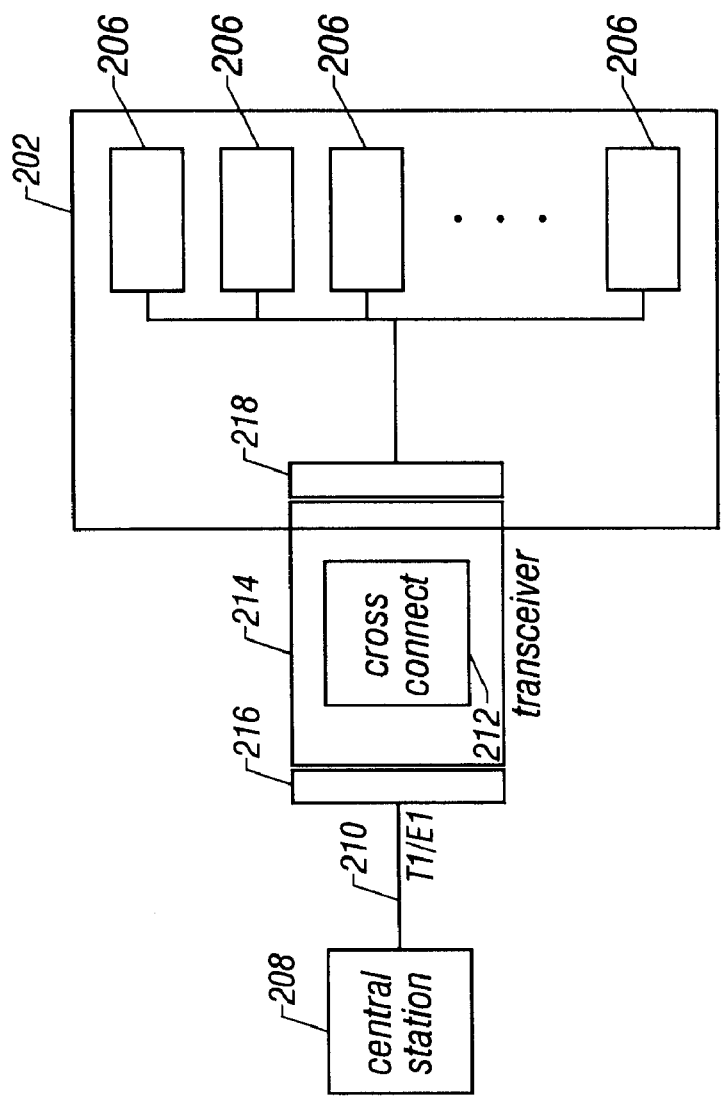
FIG. 2 is a schematic diagram of a system for switching signals in a communication system.

FIG. 2 illustrates a system 200 for switching signals from a T1 carrier according to an embodiment. An end system 202, for example, a business network, communicates with a central station 208 over transmission line 210, for example, a T1 or E1 line. The business network may include a number of system devices 206, e.g., a telephone or voicemail system device, computer network device, or voice compression devices. The central station may be a telephone company that owns the transmission lines or an Internet service provider (ISP) that leases the transmission lines and provides connection to the Internet for the end system. Frames of digital data communicated between the central station 208 and the system 202 may be switched across a cross connect 212 in a transceiver 214 at the end system according to the present embodiment. The cross connect 212 may switch the digital data in the frames between the ports on the line side bus 216 and the ports on the system side bus 218 system side bus according to a switching table.

Figure 1:
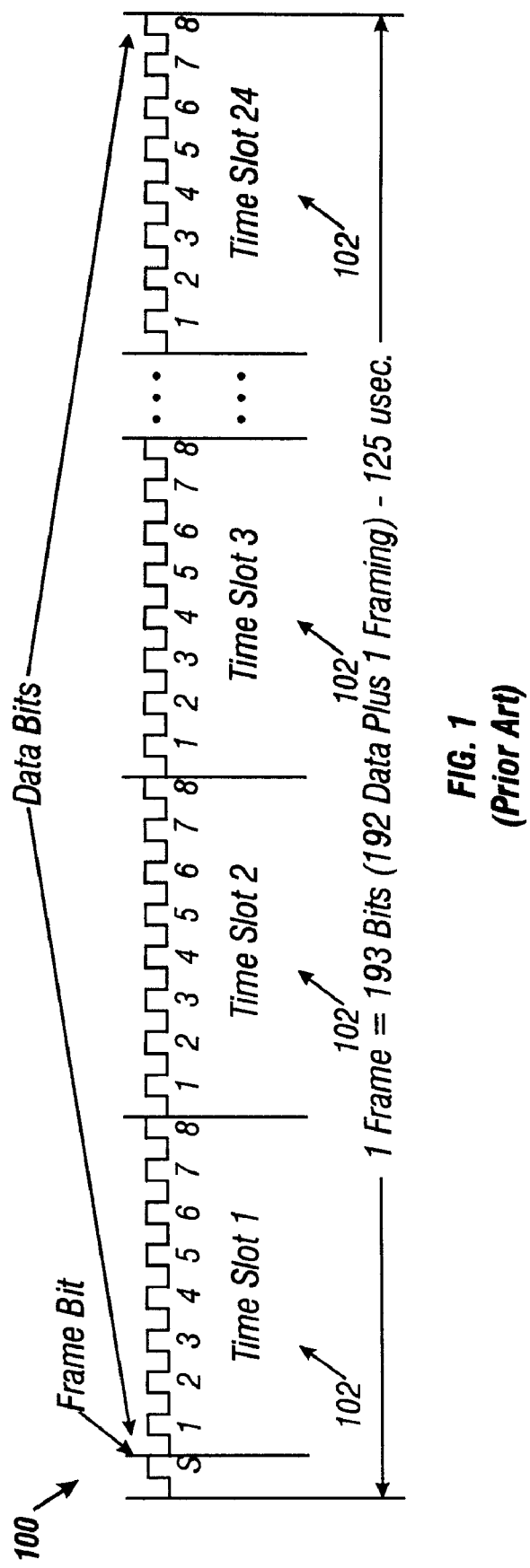
FIG. 1 is a schematic representation of a T1 frame format.

The digital signals representing the voice/data information transmitted over the transmission line 210 are formatted into frames according to a particular format (see FIG. 1). The frames 100 may be organized and transmitted according to a time division multiplex (TDM) scheme. TDM is a type of data multiplexing that combines data streams by assigning each stream a different time slot in a set. TDM repeatedly transmits a fixed sequence of time slots 102 over a single transmission channel. Within T-Carrier systems, such as T1 and T3, TDM combines Pulse Code Modulated (PCM) streams created for each conversation or data stream. PCM is a sampling technique for digitizing analog signals. PCM samples the signal 8000 times a second, each sample represented by 8 bits for a total of 64 Kbps.

The frame may include 193 bits, corresponding to twenty four 8-bit time slots 102. Each time slot 102 may correspond to one of the twenty four channels in the Transmission line. The frames may include payload information as well as frame formatting information and signaling information. Signaling information may represent phone receiver status (e.g., on-hook or off-hook) and other service type information.

Several different types of framing formats may be used in telephone communication systems. These formats may use various formatting schemes and signaling structures. These include, for example, Superframe (SF) and Extended Superframe (ESF). Also different carriers may be used to transmit frames including payload and signaling information. These include, for example, T1C, T2, T3 and E1 carriers. These various framing formats and carriers may be encompassed by various embodiments.

Figure 3:
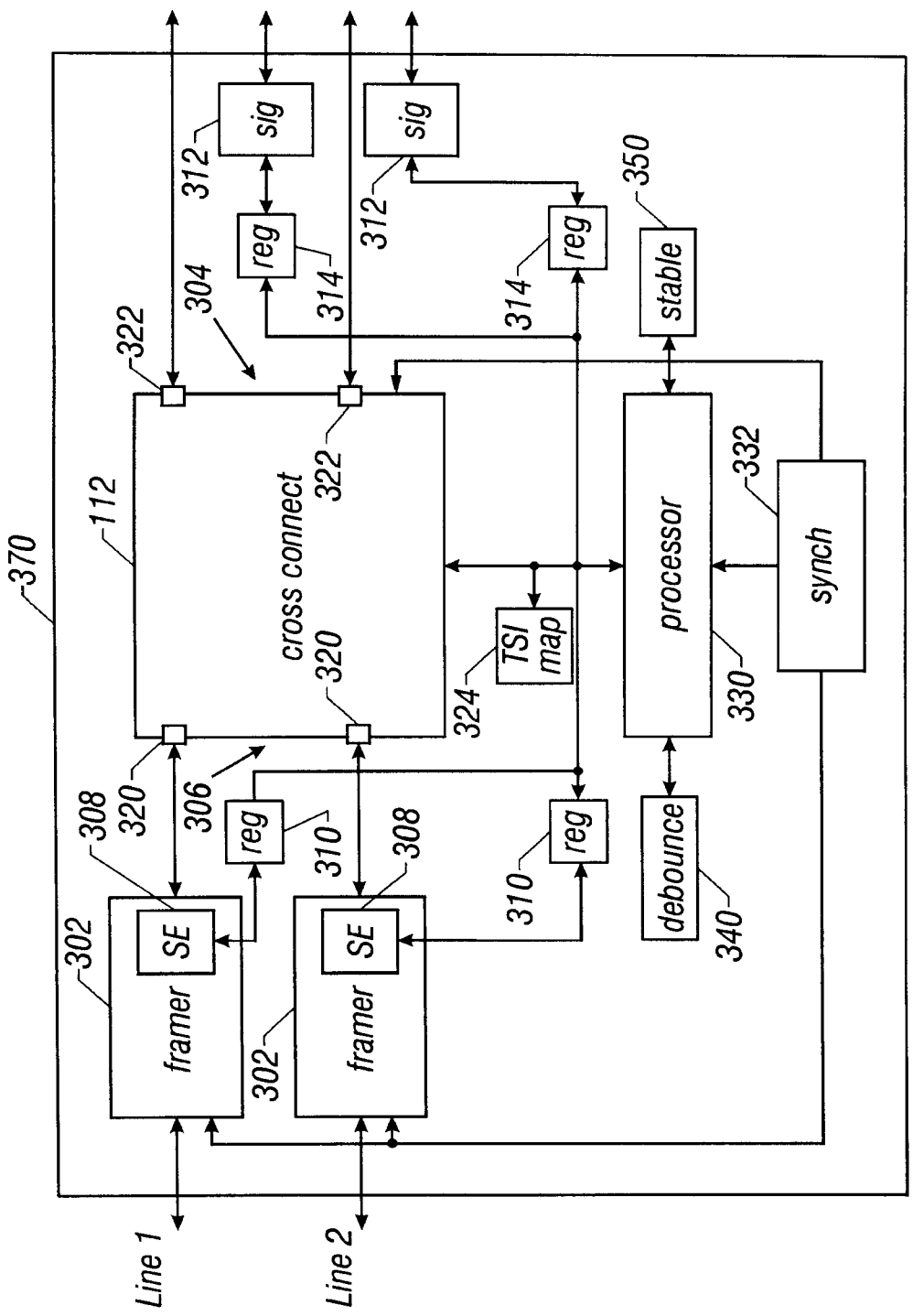
FIG. 3 is a schematic diagram of a transceiver according to an embodiment.

FIG. 3 illustrates a transceiver 114 including an integrated cross connect 212 and a framer 302 according to an embodiment. The cross connect 212 has a line side 304 and a system side 306. The framers 302 are connected to the line side 304 of the cross connect 212. The framer 302 receives digital signals from the line 210. The framer 302 recognizes the frame pattern presented in the signals. The framer 302 may include a signal inserter/extractor 308 which identifies the signaling information in the frame and extracts it for each time slot. A framer register 310 may be provided for each framer 302. The framer register 310 may store payload and signaling information output from the framer to be switched in a memory location corresponding to the associated time slot 102. The framer register 310 may also store payload and signaling information received from the system side to be formatted for transmission over the transmission line 210.

Payload and signaling information corresponding to the same time slot 102 may be transmitted in parallel on the system side 306. Payload information may be received and transmitted to the cross connect 212 at the system side ports 118. Signaling inserter/extractors 312 connected to the system side may be used to transmit and receive signaling information to and from the system side 306. System interface registers 314 may be connected to each of the signaling inserter/extractors. The system interface registers 314 may store signaling information from the system side to be switched in a memory location corresponding to the associated time slot. The system interface registers 314 may also store switched signaling information received from the line side 304.

The payload information for a time slot 102 may be transmitted from the framer 302 to a line side port 320 on the cross connect 112 and switched along dedicated circuitry in the cross connect 112 to a designated system side port 322 defined in a switching table 324. The switching table 324 may be a time slot interchange (TSI) map which relates an appropriate port on the system side bus for the payload information received in a particular time slot. The payload information is transmitted to a system device 206 in the system.

Figure 5:
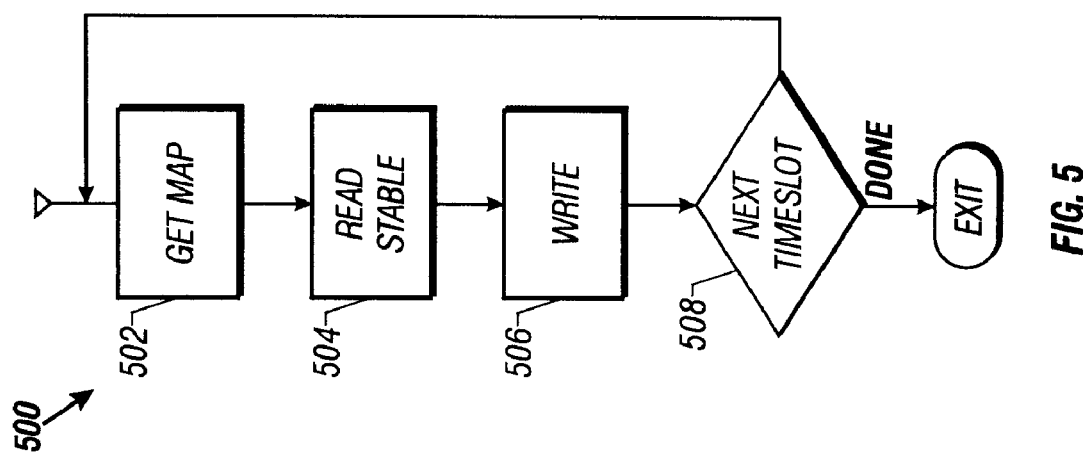
FIG. 5 is a flow diagram illustrating a write operation according to an embodiment.
Figure 4:
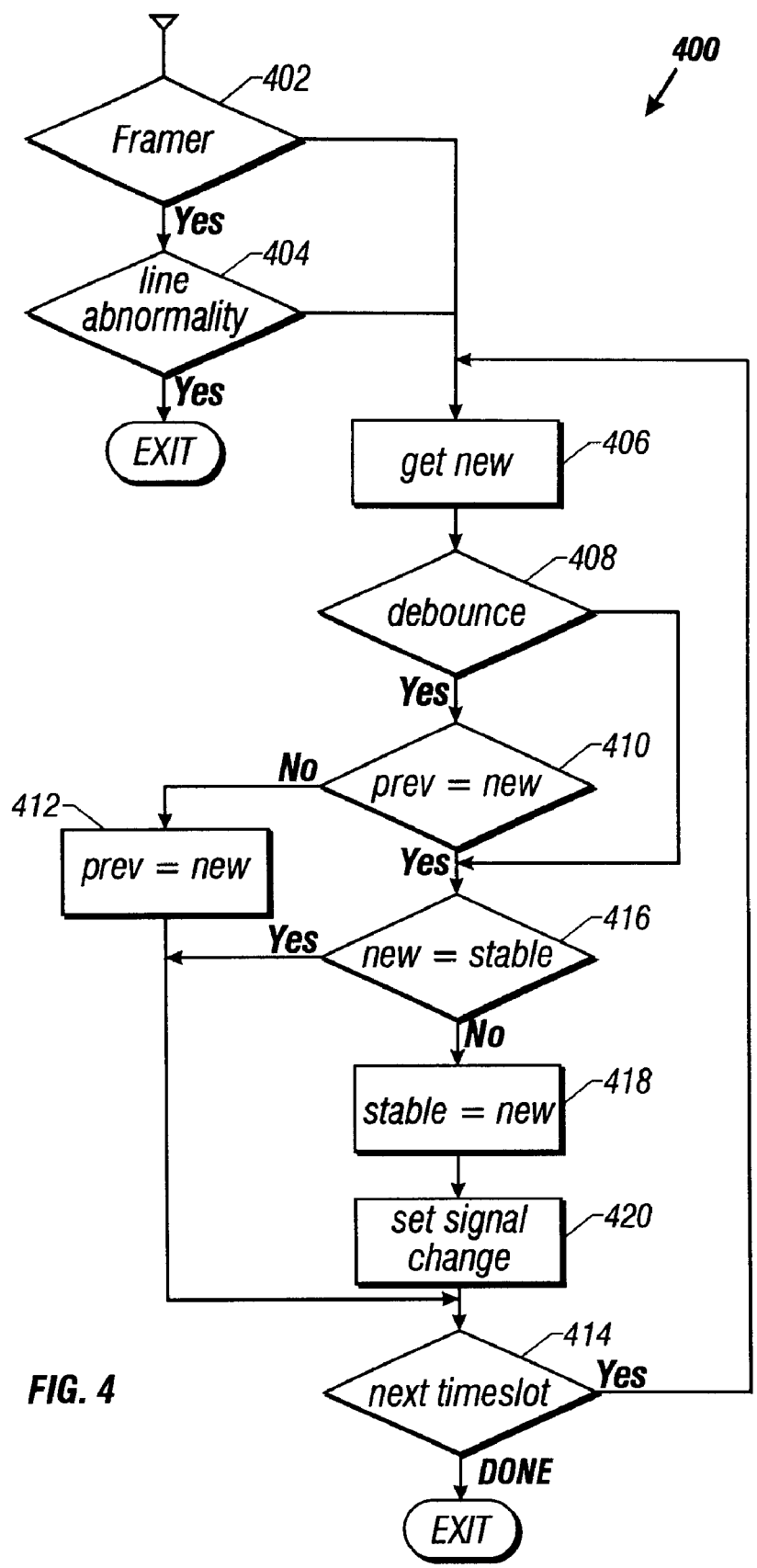
FIG. 4 is a flow diagram illustrating a read operation according to an embodiment.

According to an embodiment, the signaling information associated with a particular time slot may be processed and switched by a processor 330 using read and write operations shown in FIGS. 4 and 5, respectively.

The framers 302, processor 330, cross connect 112, and signal extractor/inserters 312 may all be controlled by a synchronizer 332. The synchronizer 332 produces a timing pulse that goes high every twenty four time slots, which may be used to coordinate the operations of these components.

For a particular time slot 102, the processor 330 may read the associated signaling information and determine if the signaling information is stable according to the read operation 400 shown in FIG. 4. The read operation reads the framer registers or system interface registers, depending on the direction of transmission, and stores a stable signaling value in a stable signaling register.

For example, consider a frame being transmitted from the transmission line 210 to the system interface. The framer determines if the framing pattern is synchronized in state 402. If the framing pattern is determined to be out of synch, the line is checked for abnormalities in state 404. If an abnormality is detected, the operation may exit and an error indicator be generated.

If the framing pattern and line condition are normal, the processor reads the signaling information for the new time slot from the framer register in state 406.

The processor may perform a debounce operation on the signaling information in the new time slot in state 408. For the present example, consider a frame having an "off-hook" signaling value. To be considered a stable signal, a change in the signaling value must remain the same for two consecutive multiframes. The signaling value of the previous time slot may be stored in a debounce register 340 connected to the processor (FIG. 3). The processor 330 compares the signaling value of the previous time slot to the new signaling value in state 410. If the new signaling value is determined to be different than the previous signaling value, e.g., an "on-hook" signal, the previous signaling value is set to the new value ("on-hook") and stored in the debounce register 340 in state 412. The signaling value of the next time slot is examined in state 414 and the operation returns to state 406. If the previous signaling value is determined to be the same as the new value, the debounce operation is completed.

The new value is compared to a stable signaling value and stored in the stable signaling register in state 416. The stable signaling value in the register is the value of the prior (and debounced, if this option is enabled) frame. If the new value is determined to be the same as the stable signaling value, the value in the stable signaling register is unchanged. The signaling information in the next time slot may then be retrieved and the operation returns to state 406.

Otherwise, the value in the stable signaling register is set to the new value in state 418, and the new stable signaling value is stored in the stable signaling register in state 420. The signaling information in the next time slot is retrieved and the operation returns to state 406.

The processor may then switch the signaling information for the current frame by writing the signaling information for that time slot to the appropriate memory location in the system interface register on the system side according to the write operation 500 shown in FIG. 5. For a given time slot, the processor may access the TSI map to determine the appropriate port for the signaling information for that time slot in state 502. The processor may retrieve the stable signaling information in the stable signaling register, in state 504, and write it to the appropriate address in the system interface register for the port designated in the TSI map in state 506. The processor 320 may then retrieve the next time slot in state 508 and perform the write operation on the next time slot returning to state 502. The signaling information which may be transmitted from the signal inserter/extractor 312 to the data stream for the system in parallel with the corresponding payload information for that time slot.

Payload and signaling information may also be transmitted from the system side to the line side. In this case, payload information in a time slot is switched in the dedicated circuitry of the cross connect 212 and stored in the framer register 310. The framer may then retrieve the payload information for formatting. Signaling information is received at the signaling inserter/extractor 312 and stored in the system interface register 314. The signaling information for the time slot is presented to the processor 330 and switched from the system interface register 314 to the framer register 310 according to the read and write operations described in connection with FIGS. 4 and 5. The framer retrieves the signaling information for the time slot and formats it with the corresponding payload information for transmission on the transmission line 210.

Transmission lines may be presented at two different ports 320 on the line side 304 of the cross connect 212. Similarly, system lines may be presented at two different ports 322 on the system side 306 of the cross connect, or may be presented on the same port as a time multiplexed data stream.

According to an embodiment, the framers 302, framer registers 310, cross connect 212, processor 330, signal inserter/extractors 312, system interface registers 314, and synchronizer 332 may all be provided on the same integrated circuit 370.

A number of embodiments of the invention have been described. Nevertheless, it will be understood that various modifications may be made without departing from the spirit and scope of the invention. Accordingly, other embodiments are within the scope of the following claims.

What is claimed is:

1. Apparatus comprising:
   a framer to transmit and receive a time slot in a frame including payload information and signaling information and to extract the signaling information;
   a plurality of line side ports connected to the framer;
   a plurality of system side ports;
   a payload cross connect in communication with the framer to switch the payload information between a first line side port and a corresponding first system side port in response to a switching table;
   a processor, in communication with the framer, to switch the signaling information between a second line side port and a corresponding second system side port in response to the switching table; and an integrated circuit including the framer, the payload cross connect, and the processor.

2. The apparatus of claim 1, wherein the framer is operative to receive frames from a transmission line.

3. The apparatus of claim 2, wherein the transmission line is a T1 line.

4. The apparatus of claim 2, wherein the transmission line is an E1 line.

5. The apparatus of claim 2, further comprising:

a framer register connected to the second line side port and to the framer;

a system interface register connected to the second system side port;

a stable signaling register for storing a stable signaling value;

wherein the processor is operative to switch signaling information by writing the stable signaling information to a particular location in one of the framer register and the system interface register in response to the switching table.

6. The apparatus of claim 1, wherein the switching table is a time slot interchange map.

7. The apparatus of claim 1, further comprising a synchronizer circuit connected to the framer, the payload cross connect, and the processor, said synchronizer circuit operative to produce a pulse to synchronize the framer, the payload cross connect, and the processor.

8. A system comprising:

a central station;

a transmission line comprising a first end connected to the central station and a second end;

a switch connected to the second end of the transmission line and operative to switch signals between the central station and networked system, said switch comprising:

a framer to transmit and receive a frame from the transmission line and to extract the signaling information from a time slot in the frame, said time slot including payload information and signaling information;

a plurality of line side ports connected to the framer;

a plurality of system side ports;

a payload cross connect in communication with the framer to switch the payload information between a first line side port and a corresponding first system side port in response to a switching table;

a processor in communication with the framer to switch the signaling information between a second line side port and a corresponding second system side port in response to the switching table; and an integrated circuit including the framer, the payload cross connect, and the processor.

9. The apparatus of claim 8, wherein the transmission line is a T1 line.

10. The apparatus of claim 8, wherein the transmission line is an E1 line.

11. The apparatus of claim 8, wherein the switching table is a time slot interchange map.

12. A method comprising:

receiving a time slot in a frame, said time slot including payload information and signaling information;

retrieving a switching instruction from a switching table with a processor;

extracting the signaling information from the time slot;

determining a stable signaling value in response to the signaling information;

writing the stable signaling value to a location in a register corresponding to the time slot in response to the switching instructions; and debouncing the signaling information.

13. The method of claim 12, wherein debouncing the signaling information comprises:

comparing a value of the signaling information to a previous signaling value;

setting the previous signaling value to the value of the signaling information in response to the previous signaling value differing from the value of the signaling information and examining signaling information in a subsequent time slot; and determining a stable signaling value in response to the previous signaling value matching the value of the signaling information.

14. The method of claim 12, wherein the register is a framer register.

15. The method of claim 12, wherein the register is a system interface register.

16. An apparatus, including instructions residing on a machine-readable medium, for use in a communication system for switching signals, the instructions causing the machine to:

receive a time slot in a frame, said time slot including payload information and signaling information;

retrieve a switching instruction from a switching table with a processor;

extract the signaling information from the time slot;

determine a stable signaling value in response to the signaling information;

write the stable signaling value to a location in a register corresponding to the time slot in response to the switching instructions; and debounce the signaling information.

17. The apparatus of claim 16, the instructions further causing the machine to:

compare a value of the signaling information to a previous signaling value;

set the previous signaling value to the value of the signaling information in response to the previous signaling value differing from the value of the signaling information and examining signaling information in a subsequent time slot; and determine a stable signaling value in response to the previous signaling value matching the value of the signaling information.

18. The apparatus of claim 16, wherein the register is a framer register.

19. The apparatus of claim 16, wherein the register is a system interface register.

* * * * *